US012665347B2

(12) United States Patent
Kim

(10) Patent No.: US 12,665,347 B2
(45) Date of Patent: Jun. 23, 2026

(54) SHIELDING MODULE FOR HIGH VOLTAGE CONNECTOR

(71) Applicant: Hyundai Kefico Corporation, Gunpo (KR)

(72) Inventor: Chang Ju Kim, Seongnam (KR)

(73) Assignee: Hyundai Kefico Corporation, Gunpo (KR)

( * ) Notice: Subject to any disclaimer, the term of this patent is extended or adjusted under 35 U.S.C. 154(b) by 368 days.

(21) Appl. No.: 18/397,279

(22) Filed: Dec. 27, 2023

(65) Prior Publication Data

US 2024/0222901 A1 Jul. 4, 2024

(30) Foreign Application Priority Data

Dec. 28, 2022 (KR) ........................ 10-2022-0187820

(51) Int. Cl.
*H01R 13/52* (2006.01)
*H01R 13/6581* (2011.01)
*H01R 43/00* (2006.01)

(52) U.S. Cl.
CPC ....... *H01R 13/521* (2013.01); *H01R 13/6581* (2013.01); *H01R 43/005* (2013.01); *H01R 2201/26* (2013.01)

(58) Field of Classification Search
CPC .............. H01R 13/521; H01R 13/6581; H01R 2201/26; H01R 43/005
USPC .......................................................... 439/589
See application file for complete search history.

(56) References Cited

U.S. PATENT DOCUMENTS

| | | | | |
|---|---|---|---|---|
| 5,580,282 A * | 12/1996 | Paterek | H01R 13/521 439/271 |
| 7,481,664 B1 * | 1/2009 | Knoll | H01R 13/648 439/359 |
| 7,892,026 B2 * | 2/2011 | Langhoff | H01R 13/11 439/607.02 |
| 10,073,163 B2 | 9/2018 | Philipp et al. | |
| 2009/0221181 A1 * | 9/2009 | Langhoff | H01R 13/11 439/607.02 |
| 2013/0296994 A1 * | 11/2013 | Vaishya | H04R 25/654 607/137 |
| 2015/0382118 A1 * | 12/2015 | Vaishya | A61N 1/36038 607/57 |

FOREIGN PATENT DOCUMENTS

| | | |
|---|---|---|
| CN | 113629425 A | 11/2021 |
| KR | 10-2001-0112544 A | 12/2001 |
| KR | 10-1619860 B1 | 5/2016 |
| KR | 10-2021-0014393 A | 2/2021 |
| KR | 10-2251423 B1 | 5/2021 |
| KR | 10-2022-0115416 A | 8/2022 |

* cited by examiner

*Primary Examiner* — Gary F Paumen
(74) *Attorney, Agent, or Firm* — Fox Rothschild LLP

(57) ABSTRACT

A shielding module is connected to a high voltage connector embedded in a housing of a controller. The shielding module includes: a base plate; a shielding terminal connected to the base plate and being in contact with an inner wall of the housing and a shielding plate of the high voltage connector, and a sealing holder protruding upwardly from a top of the base plate, and having a membrane formed in a slit. A shape of the slit may be a long hole, and the membrane may have the shape of the slit.

20 Claims, 7 Drawing Sheets

A-A

SHIELDING MODULE FOR HIGH VOLTAGE CONNECTOR

CROSS REFERENCE TO RELATED APPLICATION

The present application claims under 35 U.S.C. § 119(a) the benefit of Korean Patent Application No. 10-2022-0187820, filed on Dec. 28, 2022, the entire contents of which are incorporated by reference herein.

BACKGROUND

(a) Technical Field

The present disclosure relates to a shielding module for a high voltage connector.

(b) Description of the Related Art

A waterproof controller is equipped with a separate pressure compensation element (PCE) after a housing is hermetically sealed to maintain the same internal and external air pressure. That is, since the conventional controller requires a separately mounted PCE, the housing needed to be newly redesigned depending on the waterproof/non-waterproof specification change.

In case of a high voltage connector mounted on the controller, a metal shield is formed around a high voltage terminal to reduce the noise influence of the high voltage terminal, and then the high voltage terminal is connected to the housing to form a ground. In particular, there is a need to further manufacture a coupling structure, such as forming a protrusion on the housing, so that the housing and shielding plate are grounded.

As such, whenever a specification is not mass-produced, and the housing and connector need to be redesigned/manufactured, there is a problem in that the unit cost of the product may increase substantially.

SUMMARY

The present disclosure is directed to a shielding module for a high voltage connector in which a ground structure of a housing of a controller and a high voltage connector are separately modularized, and a membrane serving as a pressure compensation element (PCE) is integrated instead of a conventional PCE, such that a new platform format is provided without incurring unnecessary costs compared to the related art.

Technical problems to be solved by the present disclosure are not limited to the above-mentioned technical problems, and other technical problems, which are not mentioned above, may be clearly understood by those skilled in the art from the following descriptions.

According to an embodiment of the present disclosure, there is provided a shielding module for a high voltage connector in which the shielding module is connected to the high voltage connector embedded in a housing of a controller, the shielding module may include: a base plate; a shielding terminal connected to the base plate and being in contact with a ground of an inner wall of the housing and a shielding plate of the high voltage connector; and a sealing holder protruding upwardly from a top of the base plate, and having a membrane in a slit in the form of a long hole.

A shape of the slit may be a long hole, and the membrane may have the shape of the slit.

The sealing member may be positioned in an assembly section with the housing.

Here, the sealing holder may have a support step that supports a sealing member between the housing and the sealing holder to prevent the sealing member positioned in an assembly section with the housing from blocking the membrane.

It is preferred that the membrane is double-injection molded around the slit.

It is preferred that the membrane is positioned in a ventilation line when the base plate is fixed to the high voltage connector.

The membrane may serve as a pressure compensation element (PCE) of the controller.

The base plate may be slidably mounted on a main body of the high voltage connector and then laser fused.

The base plate may include a protruding member protruding along an outer circumferential surface to be slidably mounted on a main body of the high voltage connector. The protruding member may be used as a base material when the base plate is mounted on the main body of the high voltage connector and laser fused.

An entire section of the base plate that is in contact with the high voltage connector may be laser fused.

A vehicle may include the high voltage connector with the shielding module.

According to another embodiment, there is provided a shielding module for a high voltage connector, the shielding module may include: a base plate; a shielding terminal connected to the base plate and being in contact with a ground of an inner wall of the housing and a shielding plate of the high voltage connector; and a sealing holder protruding upwardly from a top of the base plate and having a membrane, in which the membrane may be positioned in a ventilation line when the base plate is fixed to the high voltage connector.

An entire section of the base plate that is in contact with the high voltage connector may be laser fused.

The base plate may include a protruding member protruding along an outer circumferential surface to be slidably mounted on a main body of the high voltage connector.

The protruding member may be used as a base material when the base plate is mounted on the main body of the high voltage connector and laser fused.

It is preferred that the membrane serves as a substitute for a pressure compensation element (PCE) of the controller.

According to still another embodiment, there is provided a shielding module for a high voltage connector, the shielding module may include: a base plate; a shielding terminal connected to the base plate and being in contact with a ground of an inner wall of the housing and a shielding plate of the high voltage connector; and a sealing holder protruding upwardly from a top of the base plate and having a membrane, in which an entire section of the base plate that is in contact with the high voltage connector may be laser fused.

The base plate may be fastened by snap-fit on a main body of the high voltage connector and then laser fused.

The sealing holder may have a support step that supports a sealing member positioned between the housing and the sealing holder.

The support step may protrude at both ends in a front-to-rear direction with respect to a center portion of the sealing holder.

According to the present disclosure, a ground structure of a housing of a controller and a high voltage connector are separately modularized, and a membrane serving as a PCE is integrated instead of a conventional PCE, thereby saving unnecessary costs compared to the related art.

Accordingly, even when the housing is changed (e.g., a change to a new controller housing), a new connector is not required, and only the corresponding module can be customized and applied, thereby reducing the process and reducing the cost.

In particular, it is meaningful that it is possible to configure the controller according to shielded/unshielded, waterproof/non-waterproof specifications in a platform format without requiring new development.

DETAILED DESCRIPTION

Figure 1:
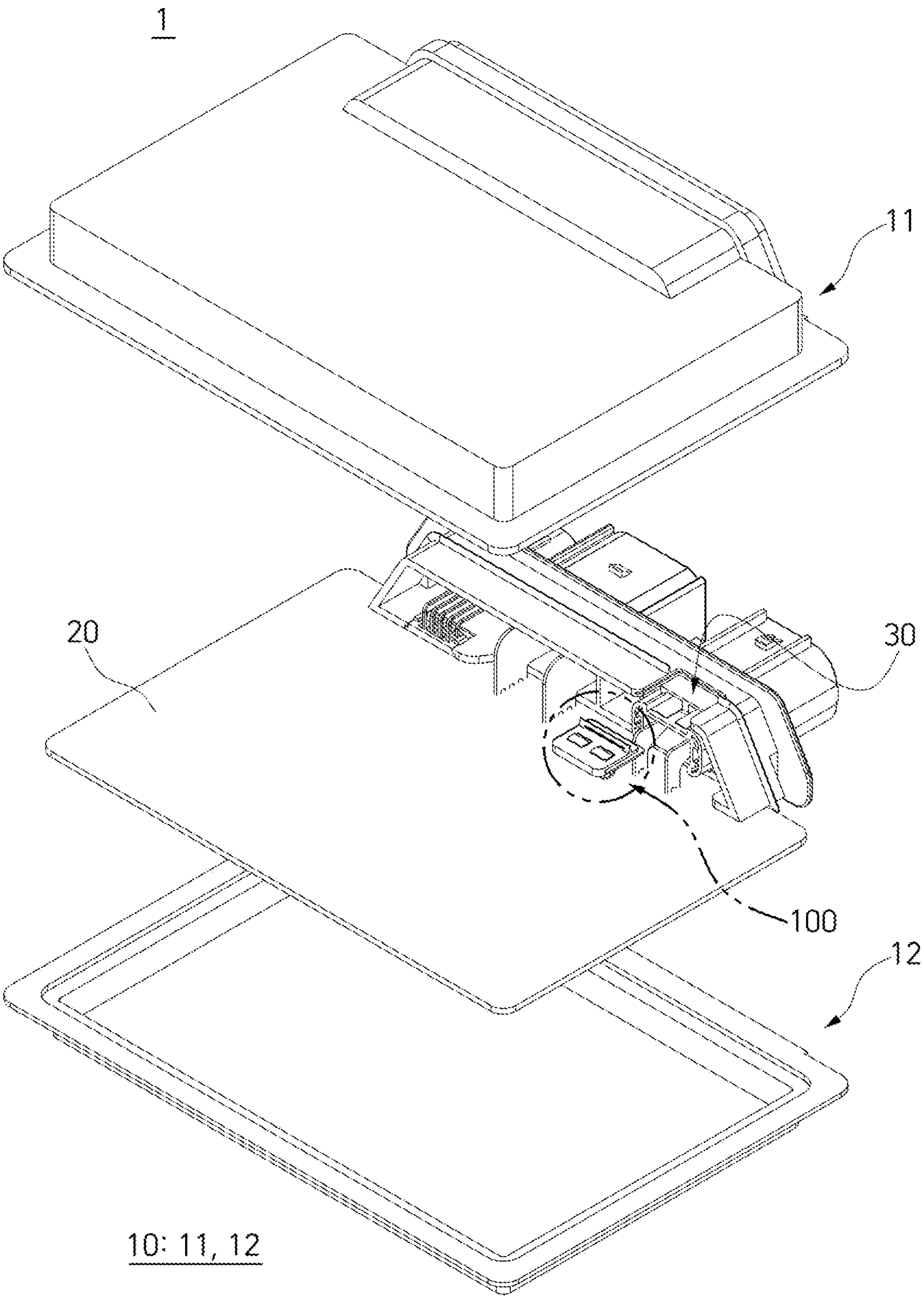
FIG. 1 is an exploded perspective view illustrating a controller with a shielding module for a high voltage connector according to an embodiment of the present disclosure being applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined by the description of the appended claims. Meanwhile, the terms used in the present specification are for explaining the embodiments, not for limiting the present disclosure. Unless particularly stated otherwise in the present specification, a singular form also includes a plural form.

Hereinafter, embodiments of the present disclosure will be described in detail with reference to the accompanying drawings.

Basic Configuration

Figure 2:
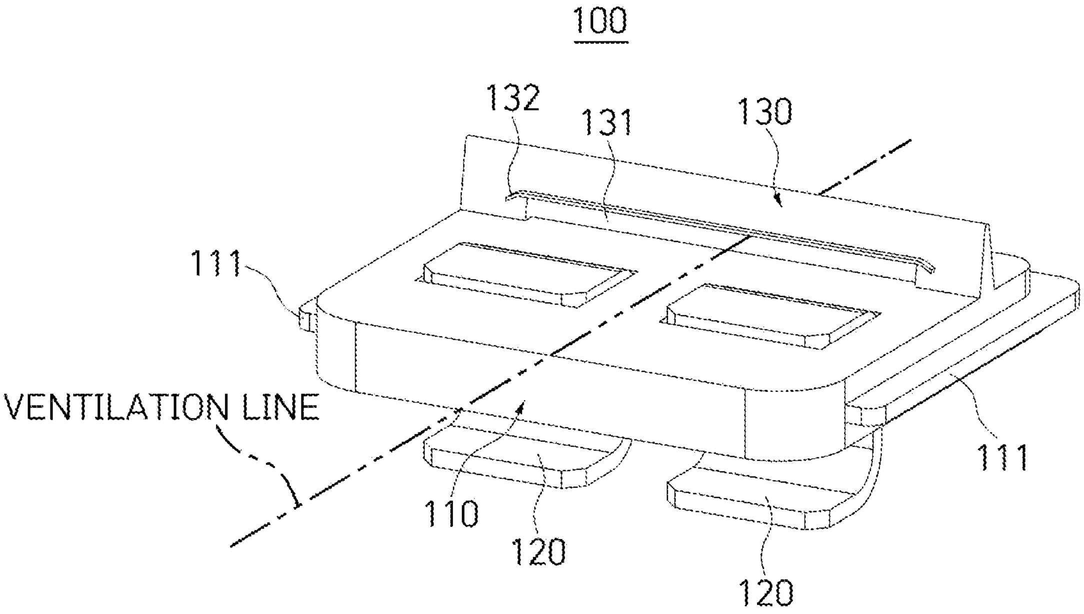
FIG. 2 is a perspective view illustrating the shielding module for a high voltage connector according to an embodiment of the present disclosure.
Figure 3:
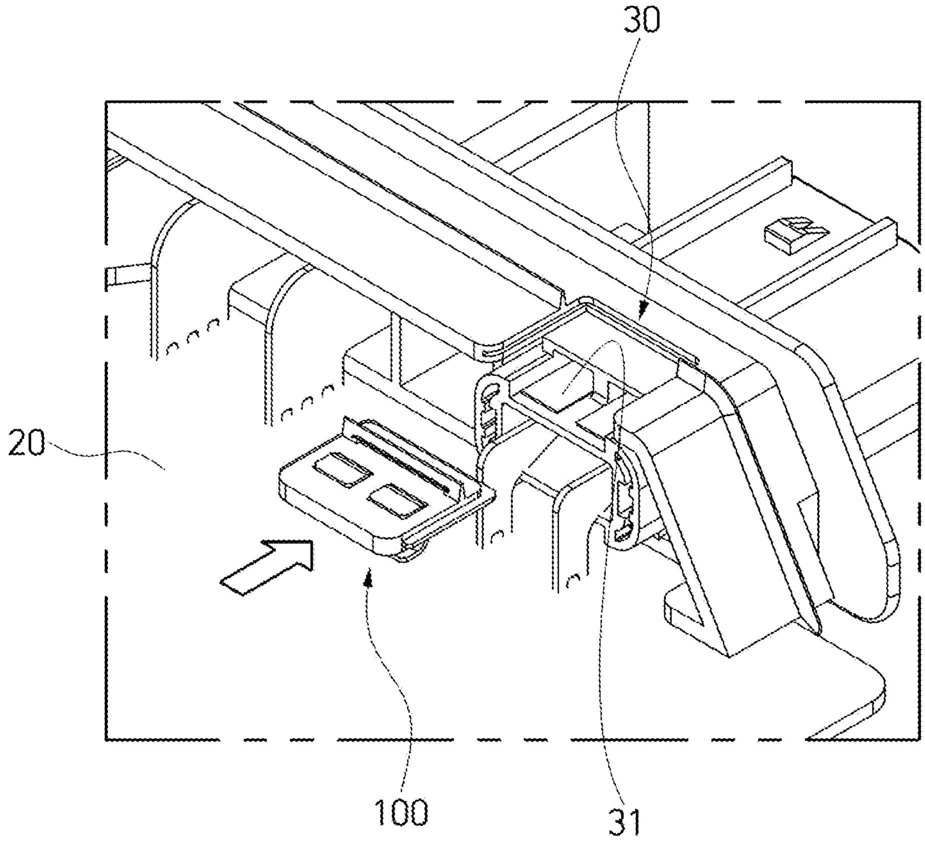
FIGS. 3 to 5 are exemplified assembled views illustrating a process in which the shielding module for a high voltage connector, according to an embodiment of the present disclosure, is installed in a high voltage connector.
Figure 4:
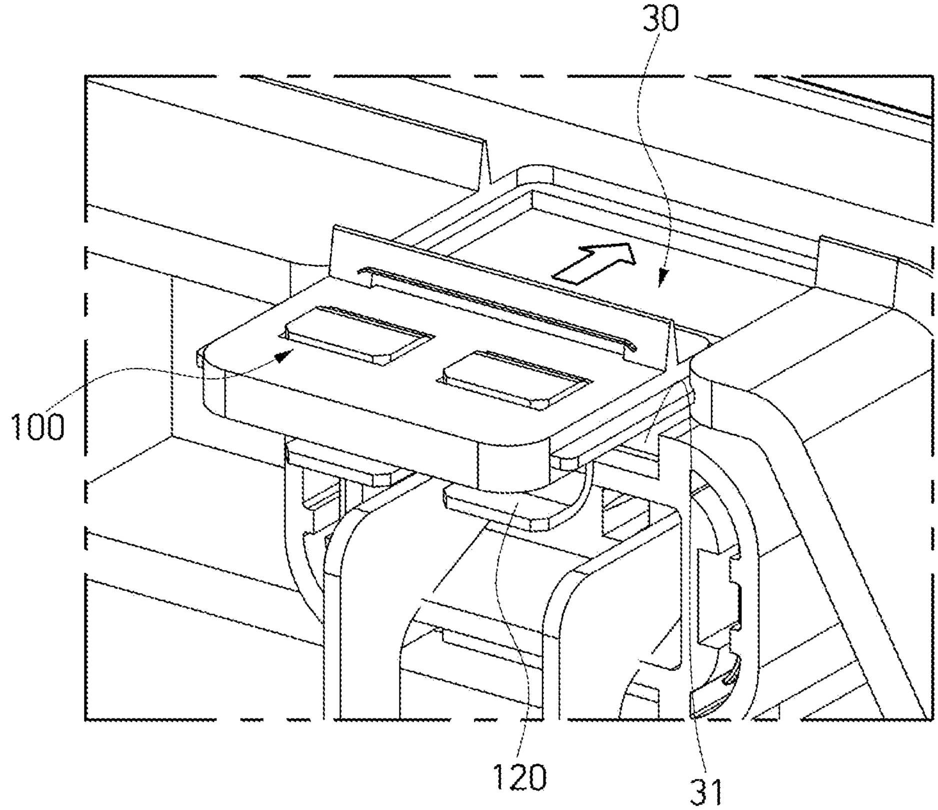
Figure 5:
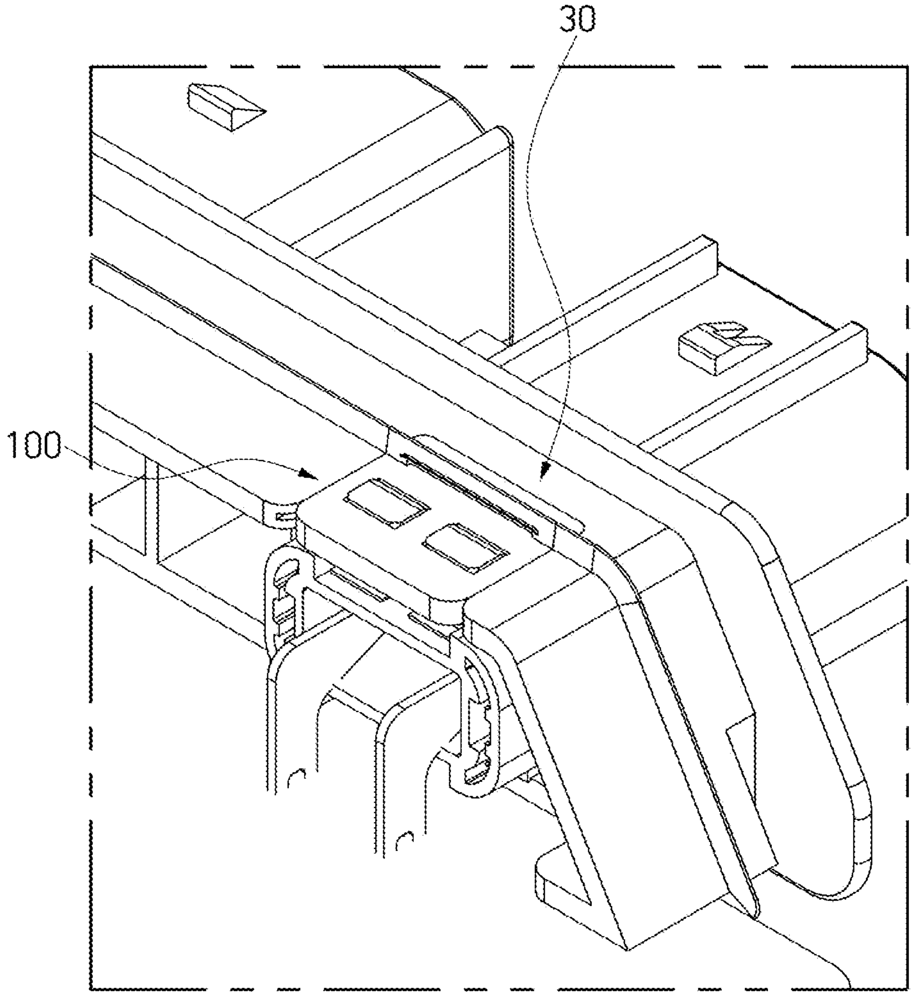

FIG. 1 is an exploded perspective view illustrating a controller with a shielding module for a high voltage connector according to an embodiment of the present disclosure being applied, and FIG. 2 is a perspective view illustrating the shielding module for a high voltage connector according to an embodiment of the present disclosure.

A shielding module 100 for a high voltage connector adopts a membrane that serves as a pressure compensation element (PCE) for internal and external ventilation of a controller 1 formed in a waterproof type, thereby maintaining the same internal and external air pressure of the controller 1 without a PCE.

The shielding module 100 for a high voltage connector electrically connects a ground portion between the high voltage connector 30 and the housing 10.

The shielding module 100 for a high voltage connector includes a base plate 110, a shielding terminal 120, and a sealing holder 130.

The base plate 110 forms a basic body of the shielding module 100 for a high voltage connector. The base plate 110 may be slidably mounted to the high voltage connector 30 to be grounded between the housing 10 of the controller 1 and the high voltage connector 30. In this case, the base plate 110 is slidably mounted on a main body of the high voltage connector 30 and then laser fused and fixed in the corresponding position.

To this end, the base plate 110 includes a protruding member 111.

The protruding member 111 protrudes along an outer circumferential surface of the base plate 110, and may be used as a base material when the base plate 110 is mounted on the main body of the high voltage connector 30 and is laser fused.

It is preferred that an entire section of the base plate 110 that is in contact with the high voltage connector 30 is laser fused.

The shielding terminal 120 is connected to the base plate 110. The shielding terminal 120 is penetratingly fastened with intervals on the base plate 110. An upper end of the shielding terminal 120 is in contact with an inner wall 13 of the housing 10, and a lower end of the shielding terminal 120 is in contact with a shielding plate 31 of the high voltage connector 30. Accordingly, the shielding terminal 120 is grounded between the housing 10 and the high voltage connector 30.

The sealing holder 130 protrudes upwardly from a top of the base plate 110 and has a membrane 131 in a slit in the form of a long hole.

The membrane 131 is double-injection molded around the slit to be formed to cover the slit. That is, the membrane 131 is formed in a form that corresponds to the shape of the slit.

It is preferred that the membrane 131 is positioned on a ventilation line when the base plate 110 is fixed to the high voltage connector 30.

The membrane 131 serves as a PCE for the controller 1. In other words, the PCE is essential to maintain the same internal and external air pressure of the controller 1, which is formed in a waterproof type, but in the present disclosure, the membrane 131 is adopted to allow the controller 1 to maintain the same internal and external air pressure without the PCE.

The sealing holder 130 may further include a support step 132 that supports the sealing member (reference numeral 32 in FIG. 8) between the housing 10 and the sealing holder 130.

Fastening Structure

FIGS. 3 to 6 illustrate a process in which the shielding module for a high voltage connector according to an embodiment of the present disclosure is installed in a high voltage connector.

The base plate 110 of the shielding module 100 for a high voltage connect may be fastened by snap-fit on the main body of the high voltage connector 30 and then laser fused. In this case, a laser fused section is preferably a joining site between the base plate 110 and the main body of the high voltage connector 30.

Figure 6:
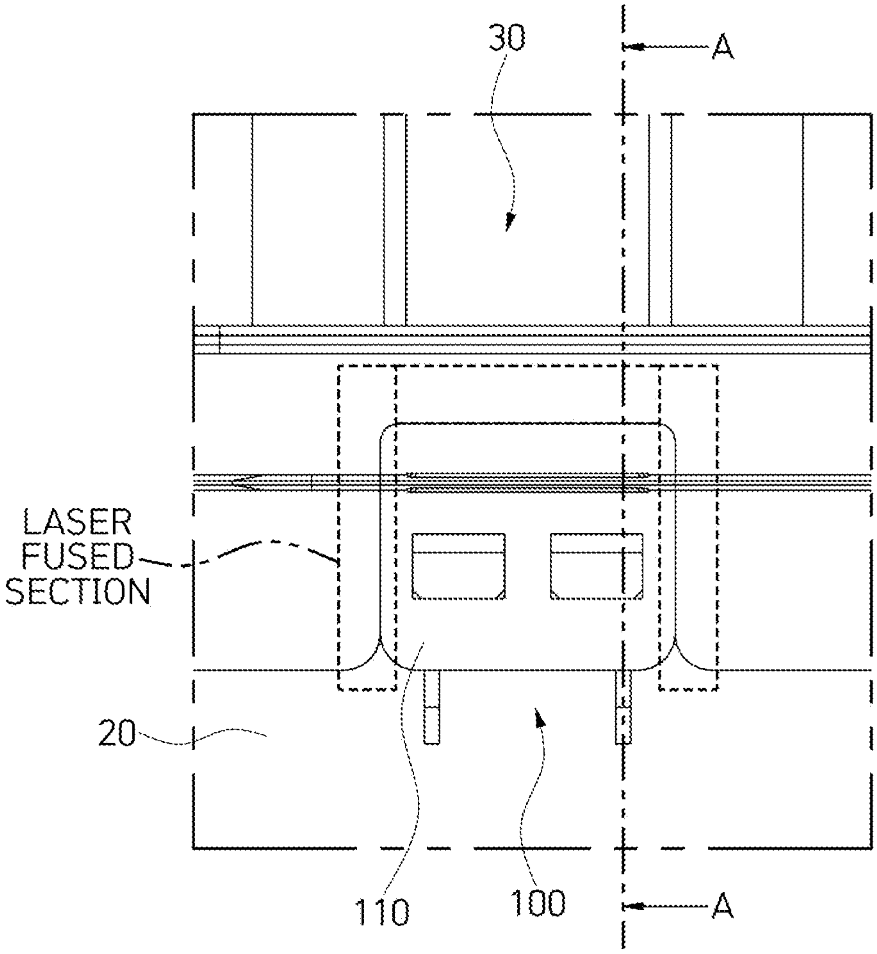
FIG. 6 is an exemplified top view illustrating that the shielding module for a high voltage connector according to an embodiment of the present disclosure is installed on the high voltage connector.
Figure 7:
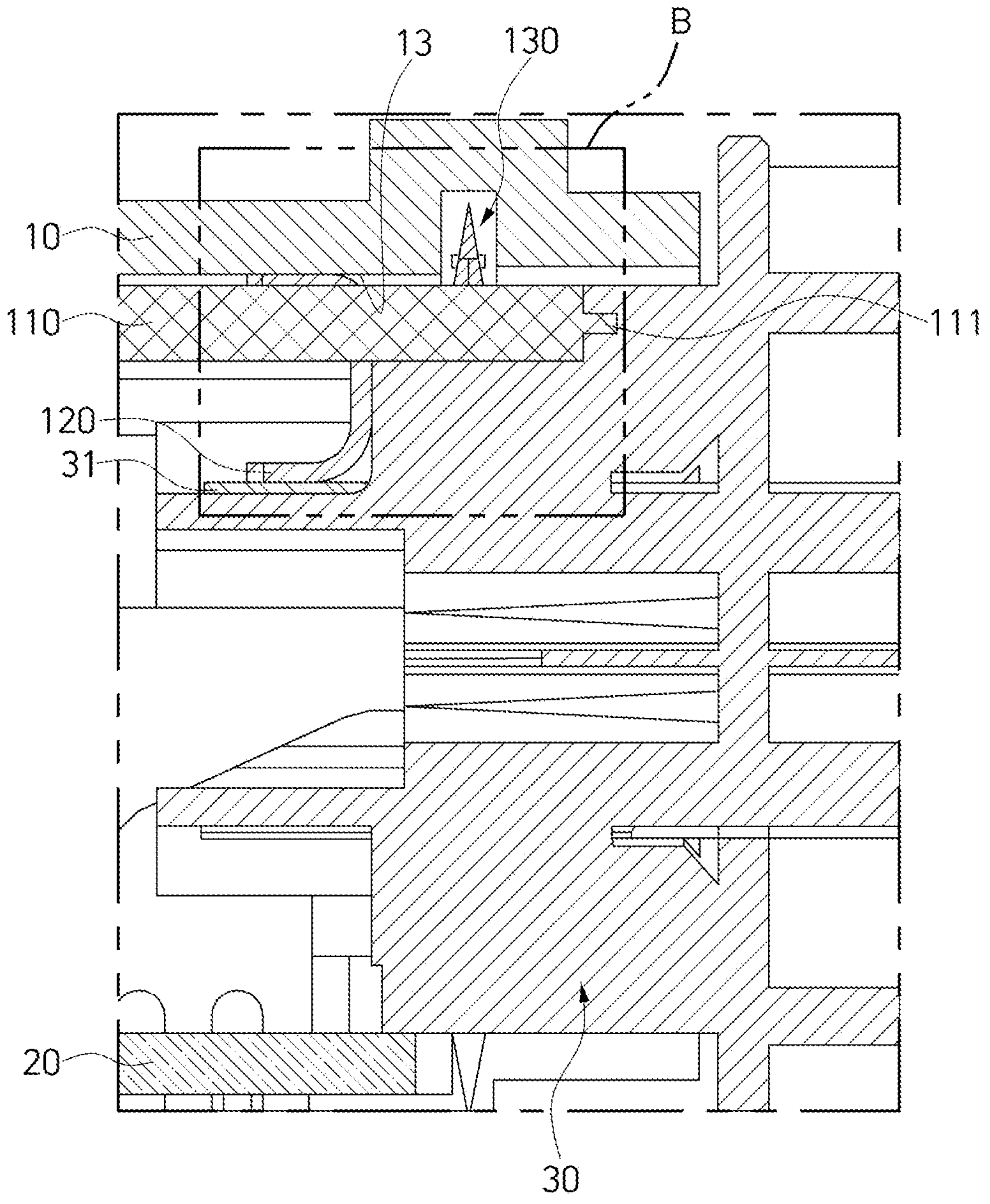
FIG. 7 is an exemplified view illustrating a cross-section taken along line A-A in FIG. 6.
Figure 8:
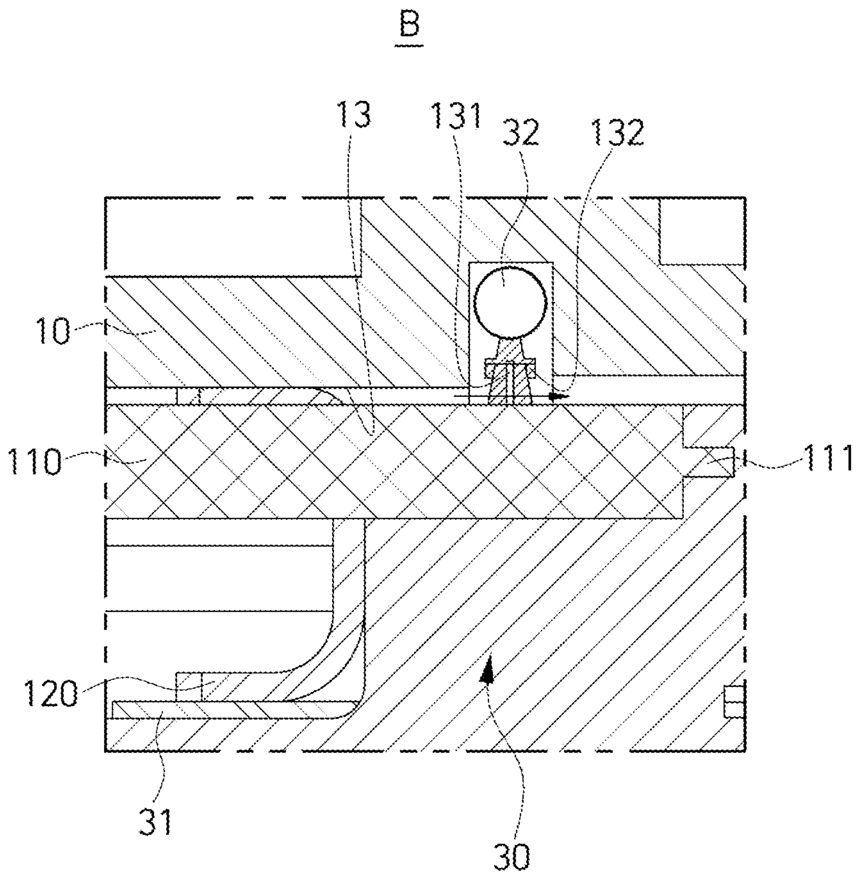
FIG. 8 is an exemplified view illustrating an enlargement of portion B in FIG. 7.

FIG. 7 is an exemplified view illustrating a cross-section taken along line A-A in FIG. 6, and FIG. 8 is an exemplified view illustrating an enlargement of portion B in FIG. 7.

The sealing holder 130 protrudes upwardly from some portion of the base plate 110, and when the housing 10 is assembled, the sealing member 32 is positioned between the sealing holder 130 and the housing 10. The sealing member 32 primarily forms a shielding structure of the housing 10 and is made of a rubber material that is deformable, so that the sealing member 32 may fall into a gap at the bottom and block the ventilation line of the membrane 131.

Accordingly, the sealing holder 130 has the support step 132 that supports the sealing member 32 between the housing 10 and the sealing holder 130 to prevent the sealing member 32, which is positioned in an assembly section with the housing 10, from blocking the membrane 131. Here, the support step 132 may protrude at both ends in a front-to-rear direction with respect to a center portion of the sealing holder 130.

Because the membrane 131 is fixed with a double-injection molding, it is possible to compensate for the pressure of the housing 10. The membrane 131 in the drawings functions as a single long hole, but may be in the form of being double-injection molded into a plurality of holes spaced at regular intervals. Alternatively, a hole size of only a portion of the main ventilation line may be formed to be large and the remaining holes may be formed to be small, but the membrane 131 may be double-injection molded into the holes. As a result, in the present disclosure, even when the housing 10 is changed (e.g., a change to a new controller housing), a new connector is not required, and only the corresponding module can be customized and applied, thereby reducing the process and reducing the cost.

While the above preferred embodiment has described in detail the configuration of the present disclosure, it is for illustrative purposes only, and various modifications and alterations may of course be made within the scope of the technical spirit of the present disclosure being allowed.

What is claimed is:

1. A shielding module for a high voltage connector in which the shielding module is connected to the high voltage connector embedded in a housing of a controller, the shielding module comprising:

a base plate;

a shielding terminal connected to the base plate and being in contact with an inner wall of the housing and a shielding plate of the high voltage connector; and a sealing holder protruding upwardly from a top of the base plate, and having a membrane arranged in a slit, wherein the sealing holder has a support step that supports a sealing member between the housing and the sealing holder to prevent the sealing member from blocking the membrane.

2. The shielding module of claim 1, wherein a shape of the slit is a long hole, and the membrane has the shape of the slit.

3. The shielding module of claim 1, wherein the sealing member is positioned in an assembly section of the housing.

4. The shielding module of claim 1, wherein the membrane is double-injection molded around the slit.

5. The shielding module of claim 1, wherein the membrane is positioned in a ventilation line when the base plate is fixed to the high voltage connector.

6. The shielding module of claim 1, wherein the membrane serves as a pressure compensation element (PCE) of the controller.

7. The shielding module of claim 1, wherein the base plate is slidably mounted on a main body of the high voltage connector and then laser fused.

8. The shielding module of claim 1, wherein the base plate includes a protruding member protruding along an outer circumferential surface to be slidably mounted on a main body of the high voltage connector, and wherein the protruding member is used as a base material when the base plate is mounted on the main body of the high voltage connector and laser fused.

9. The shielding module of claim 1, wherein an entire section of the base plate that is in contact with the high voltage connector is laser fused.

10. A vehicle comprising the high voltage connector with the shielding module of claim 1.

11. A shielding module for a high voltage connector in which the shielding module is connected to the high voltage connector embedded in a housing of a controller, the shielding module comprising:

a base plate;

a shielding terminal connected to the base plate and being in contact with a ground of an inner wall of the housing and a shielding plate of the high voltage connector; and a sealing holder protruding upwardly from a top of the base plate and having a membrane, wherein the membrane is positioned in a ventilation line when the base plate is fixed to the high voltage connector.

12. The shielding module of claim 11, wherein the membrane has a shape of a long hole.

13. The shielding module of claim 11, wherein an entire section of the base plate that is in contact with the high voltage connector is laser fused.

14. The shielding module of claim 13, wherein the base plate includes a protruding member protruding along an outer circumferential surface to be slidably mounted on a main body of the high voltage connector.

15. The shielding module of claim 14, wherein the protruding member is used as a base material when the base plate is mounted on the main body of the high voltage connector and laser fused.

16. The shielding module of claim 11, wherein the membrane serves as a substitute for a pressure compensation element (PCE) of the controller.

17. A shielding module for a high voltage connector in which the shielding module is connected to the high voltage connector embedded in a housing of a controller, the shielding module comprising:

a base plate;

a shielding terminal connected to the base plate and being in contact with a ground of an inner wall of the housing and a shielding plate of the high voltage connector; and a sealing holder protruding upwardly from a top of the base plate and having a membrane, wherein an entire section of the base plate that is in contact with the high voltage connector is laser fused.

18. The shielding module of claim 17, wherein the base plate is fastened by snap-fit on a main body of the high voltage connector and then laser fused.

19. The shielding module of claim 17, wherein the sealing holder has a support step that supports a sealing member positioned between the housing and the sealing holder.

20. The shielding module of claim 19, wherein the support step protrudes at both ends of the sealing holder in a front-to-rear direction with respect to a center portion of the sealing holder.

* * * * *